United States Patent
Tanaka et al.

(10) Patent No.: US 8,520,294 B2
(45) Date of Patent: Aug. 27, 2013

(54) METHOD FOR MANUFACTURING LIGHT CONTROL PARTICLES AND LIGHT CONTROL FILM USING LIGHT CONTROL PARTICLES OBTAINED BY THE METHOD

(75) Inventors: Tooru Tanaka, Tsukuba (JP); Hitoshi Yamazaki, Hitachi (JP); Satoyuki Nomura, Tsukuba (JP); Yoshii Morishita, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 296 days.

(21) Appl. No.: 12/992,360

(22) PCT Filed: May 14, 2009

(86) PCT No.: PCT/JP2009/059000
§ 371 (c)(1),
(2), (4) Date: Nov. 12, 2010

(87) PCT Pub. No.: WO2009/139444
PCT Pub. Date: Nov. 19, 2009

(65) Prior Publication Data
US 2011/0063715 A1    Mar. 17, 2011

(30) Foreign Application Priority Data
May 15, 2008  (JP) ................. 2008-128560

(51) Int. Cl.
G02B 26/00    (2006.01)
(52) U.S. Cl.
USPC .......................................... 359/296
(58) Field of Classification Search
USPC .......................................... 359/296
See application file for complete search history.

(56) References Cited

U.S. PATENT DOCUMENTS

| 4,877,313 | A | 10/1989 | Saxe et al. |
| 5,093,041 | A | 3/1992 | Check, III et al. |
| 5,516,463 | A | 5/1996 | Check, III et al. |

FOREIGN PATENT DOCUMENTS

| JP | 1-34369 | 7/1989 |
| JP | 03-45905 | 2/1991 |

(Continued)

OTHER PUBLICATIONS

English Translation of the Preliminary Report on Patentability dated Jan. 20, 2011, for Application No. PCT/JP2009/059000.

*Primary Examiner* — Joseph P Martinez
(74) *Attorney, Agent, or Firm* — Antonelli, Terry, Stout & Kraus, LLP.

(57) ABSTRACT

Disclosed is a method for manufacturing light control particles usable for a light control material comprising:
 a resin matrix made from a polymeric medium that is cured by irradiating with an energy beam; and
 a light control suspension comprising: a dispersing medium; and the light control particles that are dispersed in the dispersing medium so as to be in a flowing state,
 the method comprising the step of granulating after mixing elemental molecular iodine (A), an alkaline earth metal iodide (B), and a heterocyclic compound (C) with each other in a medium,
 wherein in the step of granulating, reaction is carried out in the presence of methanol in an amount of not less than 50 parts by mass but not more than 110 parts by mass relative to 100 parts by mass of the whole of components (A), (B) and (C). In this way, it is possible to provide a method for manufacturing light control particles wherein the effect of water is decreased in a granulating step of the method in order to yield effectively light control particles having a particle size and shape optimal for light control material and further a good reproducibility is attained.

11 Claims, 2 Drawing Sheets

(56) References Cited

FOREIGN PATENT DOCUMENTS

| | | | |
|---|---|---|---|
| JP | 03-045905 | * | 2/1991 |
| JP | 5-302074 | | 11/1993 |
| JP | 05-302074 | * | 11/1993 |
| JP | 07-168211 | * | 7/1995 |
| JP | 7-168211 | | 7/1995 |
| JP | 2871837 | | 1/1999 |
| JP | 3434295 | | 5/2003 |
| JP | 3448354 | | 7/2003 |

* cited by examiner

METHOD FOR MANUFACTURING LIGHT CONTROL PARTICLES AND LIGHT CONTROL FILM USING LIGHT CONTROL PARTICLES OBTAINED BY THE METHOD

TECHNICAL FIELD

The present invention relates to a method for manufacturing light control particles. More specifically, the invention relates to a method for manufacturing light control particles used in a light control film having a light transmittance variable in accordance with the magnitude of an electric field. The invention also relates to a light control film using light control particles obtained by the manufacturing method.

BACKGROUND ART

Light control material is a material having a light transmittance variable in accordance with the magnitude of an applied electric field, so as to be adjustable in the quantity of incident light. A light control material is obtained, for example, by dispersing, into a resin matrix, a light control suspension wherein light control particles responsible to an electric field are dispersed. Known is a light control film wherein a light control layer obtained by making the light control material into a film form is sandwiched between transparent electroconductive substrates.

This light control film is a film using a light control layer in which fine droplets of a light control suspension wherein light control particles are dispersed are dispersed in a resin matrix cured by irradiation with ultraviolet rays. The light control particles in the light control film undergo Brownian movement in the state that no electric field is applied thereto, thereby adsorbing, scattering or reflecting light; thus, the film cannot transmit incident light onto the film. When an electric field is applied thereto, the light control particles are polarized, thereby being arranged in directions parallel to each other in accordance with the electric field. As a result, the film starts transmitting incident light onto the film. In such a way, the film adjusts the transmission quantity of light by the response of its light control particles to an electric field (see, for example, Patent Document 1).

As the light control particles, particles described in Patent Document 2 are known. In recent years, however, it has been considered that light control particles disclosed in Patent Document 3 are the closest to light control particles to be commercialized since the particles are excellent in heat resistance and weather resistance.

Out of methods for manufacturing the light control particles, for example, a method disclosed in Patent Document 4 is a preferred manufacturing method since the method is the best in productivity. However, water significantly affects the particle size and the shape of the light control particles; thus, it is indispensable to analyze strictly the total amount of water present in the reaction system when the particles are produced. About, for example, cellulose nitrate, which is added in order to prevent the light control particles from aggregating and other purpose in the manufacturing method, is a commercially available product and generally contains water in an amount up to about 5% by mass. The water amount therein needs to be precisely measured. About calcium iodide, as which a dehydration product of a cheap hydrate thereof is frequently used, it is necessary to measure the amount of water remaining therein precisely.

In order to prepare the light control particles to have a particle size and a shape optimal for light control material, it is necessary to adjust strictly the amount of water present in the reaction system when the particles are manufactured.

As described above, in the method for manufacturing light control particles disclosed in Patent Document 4, it is essential for preparing light control particles having a particle size and a shape optimal for light control material to adjust strictly the amount of water present in the system when particles are manufactured. Furthermore, narrow is a permissible range of the water amount required for obtaining light control particles having a desired particle size and shape. It is therefore very difficult to adjust the water amount when light control particles are mass-produced. Thus, this method has a problem in industrial applicability, so as not to be easily industrialized.

PRIOR ART DOCUMENTS

Patent Documents

Patent Document 1: Japanese Patent No. 3434295
Patent Document 2: JP-B-1-34369
Patent Document 3: Japanese Patent No. 2871837
Patent Document 4: Japanese Patent No. 3448354

DISCLOSURE OF THE INVENTION

Technical Problem

In light of the above, therefore, it is an object of the invention to provide a method for manufacturing light control particles wherein: the effect of the amount of water is decreased in a granulating step of the method in order to yield effectively light control particles having a particle size and shape optimal for light control material and further a good reproducibility is attained, the water being an essential component for light control particle manufacture but affecting the particle size and shape.

Solution to Problem

The inventors have made eager investigations repeatedly to find out that coexistence of methanol in a specified amount in a granulating step of a method for manufacturing light control particles can make the effect of water onto the particle size and shape of the resultant light control particles decrease. As a result thereof, the invention has been made.

Thus, the invention is as follows:

(1) A method for manufacturing light control particles usable for a light control material comprising:
a resin matrix made from a polymeric medium that is cured by irradiating with an energy beam; and
a light control suspension comprising: a dispersing medium; and the light control particles that are dispersed in the dispersing medium so as to be in a flowing state,
the method comprising the step of granulating after mixing elemental molecular iodine (A), an alkaline earth metal iodide (B), and a heterocyclic compound (C) with each other in a medium,
wherein in the step of granulating, reaction is carried out in the presence of methanol in an amount of not more than 50 parts but not more than 110 parts by mass relative to 100 parts by mass of the whole of components (A), (B) and (C).

(2) The method for manufacturing light control particles according to the above item (1), wherein the alkaline earth metal iodide (B) is calcium iodide.

(3) The method for manufacturing light control particles according to the above item (1) or (2), wherein the heterocyclic compound (C) is a compound represented by the following formula (1):

[Chemical Formula 1]

Formula (1)

wherein $R_1$ and $R_2$ each independently represent hydrogen or an alkyl group, which is a saturated hydrocarbon, and the number of carbon atoms of the alkyl group ranges from 1 to 13.

(4) The method for manufacturing light control particles according to any one of the above items (1) to (3), wherein in the granulating step, cellulose nitrate is caused to coexist therewith.

(5) A light control film, having a light control layer including a light control material comprising:

a resin matrix made from a polymeric medium that is cured by irradiating with an energy beam; and a light control suspension comprising: a dispersing medium; and light control particles that are dispersed in the dispersing medium so as to be in a flowing state, wherein the light control particles are obtained by the method for manufacturing light control particles according to any one of the above items (1) to (3).

According to the invention, it is possible to provide a method for manufacturing light control particles wherein the effect of water can be decreased in a granulating step for yielding a particle size and a shape of light control particles suitable as light control material, and a good reproducibility is attained.

Advantageous Effects of the Invention

The disclosure of the present application is related to the subject matters described in Japanese Patent Application No. 2008-128560 filed on May 15, 2008, and the disclosure contents thereof are incorporated herein by reference.

BEST MODES FOR CARRYING OUT THE INVENTION

Hereinafter, the invention will be described in detail.

The method of the invention for manufacturing light control particles usable for a light control material comprises:

a resin matrix made from a polymeric medium that is cured by irradiating with an energy beam; and a light control suspension comprising: a dispersing medium; and the light control particles that are dispersed in the dispersing medium so as to be in a flowing state, the method comprising the step of granulating after mixing elemental molecular iodine (A), an alkaline earth metal iodide (B), and a heterocyclic compound (C) with each other in a medium, wherein in the step of granulating, reaction is carried out in the presence of methanol in an amount of not less than 50 parts but not more than 110 parts or less by mass relative to 100 parts by mass of the whole of components (A), (B) and (C).

The light control particles yielded by the method for manufacturing light control particles of the invention are used for a light control material. The light control material in the invention comprises: a light control suspension having a dispersing medium and the light control particles that are floated and dispersed in the dispersing medium so as to be in a flowing state; and a resin matrix made from a polymeric medium that is cured by irradiating with an energy beam.

The light control material is used for a light control layer in a film form. By sandwiching the light control layer between two transparent electroconductive substrates or between others, a light control film can be formed.

In the light control layer of the light control film, the light control suspension, which is in a liquid form, is dispersed in the polymeric medium, which is in a solid form, so as to be in the form of fine droplets. In the state that no electric field is applied to the light control film, the film absorbs, scatters or reflects light by a random arrangement of the light control particles, so that the film hardly transmits light rays incident onto the film. However, when an electric field is applied to the light control film, the light control particles are arranged in a direction parallel to the electric field since the light control particles have electrical dipole moment. As a result, the film transmits light rays incident onto the film. In this way, the light control particles make a response to the applied electric field, whereby the transmission amount of light can be adjusted. The light control particles are preferably particles in a needle form or rod form.

The size of particles used for the light control film would be preferably the following size in light of a relationship between the time for a response to an electric field applied when the particles are made into the light control film, and the aggregation and precipitation thereof in the light control suspension.

The long diameter of the light control particles is preferably within the range from 225 to 625 nm, more preferably within the range from 250 to 550 nm, even more preferably within the range from 300 to 500 nm.

The ratio of the long diameter of the light control particles to the short diameter thereof, that is, the aspect ratio is preferably within the range from 3 to 8, more preferably within the range from 3.3 to 7, even more preferably within the range from 3.6 to 6.

The long diameter and the short diameter of the light control particles in the invention can be calculated out as follows: the light control particles are photographed with an electron microscope such as a scanning electron microscope or a transmission electron microscope; from the photographed image, fifty of the light control particles are extracted at will; and the long diameters of the individual light control particles, as well as the short diameters thereof, are averaged. The long diameter is defined as the length of the longest region of each of the light control particles projected into two-dimensional viewing field on the basis of the photographed image. The short diameter is defined as the length of the longest region perpendicular to the long diameter.

For a method for estimating the particle diameter of the light control particles in the invention, use is made of a particle size distribution meter using a principle of the photon correlation method or the dynamic light scattering method. In this method, a direct measurement of the size or the shape of any particle is not made, and on the supposition that the particle is sphere, the equivalent diameter thereof is estimated. Thus, the particle diameter is a value different from the value according to SEM observation. In the case of using, in particular, Zetasizer nano series manufactured by Sysmex Corp. to define, as the particle diameter, the equivalent diameter outputted as a Z average, the particle diameter of the light control particles, which may be referred to as the "particle diameter obtained by particle size distribution measurement" hereinafter, is preferably within the range from 135 to 220 nm, more preferably within the range from 140 to 210 nm, even more preferably within the range from 145 to 205 nm.

It is known that this Z average value exhibits a good correlation with a value measured with a different particle size distribution meter, the value being based on, for example, the light correlation method or the dynamic light scattering method, specifically, the above-mentioned long diameter and short diameter of the light control particles, which are each measured by an electron microscope such as a transmission electron microscope.

The elemental molecular iodine (A) used in the invention is a compound of an iodine simple substance, and is generally denoted by $I_2$. The elemental molecular iodine (A) may be charged as it is into the reaction system. Preferably, the component (A) is entirely dissolved in a medium, and the resultant is charged into the. Moreover, it is allowable to dissolve the component (A) beforehand into a medium, and charge the component (A) in the form of the solution for the following reason: when the component is made into the solution, all the molecules become reactive from the viewpoint of reaction quantity theory. In this case, the concentration thereof in the solution is preferably within the range from 3 to 20% by mass, more preferably within the range from 5 to 15% by mass, even more preferably within the range from 7 to 12% by mass.

The used elemental molecular iodine (A) is not particularly limited, and is preferably elemental molecular iodine that is easily dissolved into a medium, such as elemental molecular iodine in a powdery form or a spherical fine particle form.

The medium used for the dissolution is not particularly limited, and is preferably an organic solvent. Particularly preferred is an alkyl ester organic solvent. Specific examples thereof include acetic ester solvents such as ethyl acetate, butyl acetate, isopentyl acetate, and hexyl acetate.

The alkaline earth metal iodide (B) used in the invention is not particularly limited. For example, calcium may be used out of alkaline earth metals.

This compound, calcium iodide, has hygroscopicity. In general, a hydrate thereof is inexpensive. However, the hydrate is not easily dissolved into any organic solvent since the hydrate is in a lump form. It is therefore preferred that before the hydrate is dissolved into an organic solvent, the hydrate is dried by pressure-reduction or heating treatment to remove water as much as possible. After the removal of water, the water content by percentage is preferably 1.0% or less by mass, more preferably 0.8% or less by mass, even more preferably 0.5% or less by mass. Calcium iodide dried in such a way may be charged into the reaction system while calcium iodide is in a solid state. Preferably, calcium iodide is entirely dissolved in a medium. Moreover, it is allowable to dissolve calcium iodide beforehand into a medium, and charge the calcium iodide in the form of the solution thereinto. The concentration thereof in this solution is preferably within the range from 5 to 35% by mass, more preferably within the range from 10 to 30% by mass, even more preferably within the range from 15 to 25% by mass. A water amount of 0 to 1.0% by mass in the calcium iodide corresponds to a water amount of 0 to 0.26 part by mass relative to 100 parts by mass of the whole of the components (A), (B) and (C). It is difficult to measure this water amount precisely. In general, about calcium iodide weighed into a predetermined amount, the amount of calcium therein is estimated by titration with EDTA2Na (ethylenediamine tetraacetate) or the like, and the amount is subjected to purity-conversion, whereby the maximum water amount can be estimated.

The medium for dissolving this compound, calcium iodide, is not particularly limited, and examples thereof include acetic ester solvents such as ethyl acetate, butyl acetate, isopentyl acetate, and hexyl acetate, and alcohols such as methanol. When methanol is used to dissolve calcium iodide, the amount of methanol used in the step of granulating of the manufacturing method of the invention, from which the amount used to dissolve calcium iodide has been deducted, is set as follows: the total use amount of methanol is set to nor less than 50 parts by mass but not more than 110 parts by mass relative to 100 parts by mass of the whole of the components (A), (B) and (C).

The heterocyclic compound (C) used in the invention is not particularly limited, and is preferably a compound represented by the following formula (1):

[Chemical Formula 2]

Formula (1)

wherein $R_1$ and $R_2$ each independently represent hydrogen or an alkyl group, which is a saturated hydrocarbon, and the number of carbon atoms of the alkyl group ranges from 1 to 13.

Preferred examples of $R_1$ and $R_2$ in the formula (1) include methyl, ethyl, propyl, isopropyl, butyl, isobutyl, and t-butyl groups. More specifically, pyrazine-2,5-dicarboxylic acid and others are given as examples. These may each be used as a hydrate thereof.

The compound represented by the formula (1) may be charged into the reaction system while the compound is in a solid state. The compound may be dissolved in a medium so as to charge the resultant. However, the medium in which the compound represented by the formula (1) is dissolved is limited; thus, even after the compound is charged into the reaction system, the compound may continue to be present as an undissolved residue while the number of the particles increases. Examples of the medium used to dissolve the compound represented by the formula (1) include solvents mixed with water, and aqueous basic solutions.

The ratio between the mole numbers of the components (A), (B) and (C) used in the method for manufacturing light control particles of the invention is not particularly limited. When the individual components are used for the manufacture at a ratio of X/Y/Z, the components (A), (B) and (C) may be used at X of 1.7 to 2.3, Y of 0.7 to 1.3, and Z of 1.7 to 2.3, respectively, independently of each other. However, in order to yield light control particles in a needle form, that is, light control particles having a large aspect ratio, specifically, light control particles having an aspect ratio of 3 to 8, a long diameter of 225 to 625 nm and a particle diameter of 135 to 220 nm, the particle diameter being obtained by particle size distribution measurement, X, Y and Z are preferably from 1.8 to 2.2, from 0.8 to 1.2 and from 1.8 to 2.2, respectively, more preferably from 1.9 to 2.1, from 0.9 to 1.1 and from 1.9 to 2.1, respectively.

The medium used in the method for manufacturing light control particles of the invention is not particularly limited as the medium is an organic solvent used to dissolve the components (A), (B) and (C). The solvent preferably contains one or more acetic ester solvents, such as ethyl acetate, butyl acetate, isopentyl acetate and hexyl acetate. These solvents may be used alone or in the form of a mixture of two or more thereof.

The relationship between the total mass of the components (A), (B) and (C) used in the method for manufacturing light control particles of the invention and the mass of the used medium is not particularly limited. Preferably, the total mass of the components (A), (B) and (C) is within the range from 3 to 15% by mass of the medium. In order to produce light control particles in particular with a good reproducibility, the total mass is preferably within the range from 4 to 12% by mass, more preferably within the range from 5 to 10% by mass.

In the step of granulating of the method for manufacturing light control particles of the invention, it is also preferred to use cellulose nitrate. Cellulose nitrate is called nitrocellulose also, and is a nitric ester of cellulose. The kind thereof is not particularly limited.

In general, cellulose nitrate is classified in accordance with the nitro group content by percentage therein in the step of nitrating cellulose. Any classified species may be used as far as the specie is dissolved in an organic solvent as the medium used in the method for manufacturing light control particles of the invention.

Accordingly, when cellulose nitrate is charged into the reaction system, the nitrate may be in a solid state. The nitrate may be dissolved once in an organic solvent so as to charge the resultant thereinto. Specifically, the following are given: LIG 1/8, LIG 1/4, LIG 1/2A, LIG 1/2, HIG 1/16, HIG 1/8, HIG 1/4, HIG 1/2A, HIG 1/2, HIG 1, HIG 2, HIG 5, HIG 7 and HIG 20, manufactured by Bergerac NC Co.; DHX 1-2, DHX 3-5, DHX 4-6, DHX 5-10, DHX 8-13, DHX 11-16, DHX 30-50, DHX 40-70, LHX 25-45, DHL 120-170, DLX 3-5, DLX 5-8, DLX 8-13, and DLX 30-50 measured by Nobel Enterprise Inc., and others.

The relationship between cellulose nitrate used in the invention and the mass of the used medium is not particularly limited. Preferably, the total mass of cellulose nitrate is within the range from 5 to 20% by mass of the medium. In order to produce light control particles in particular with a good reproducibility, the total mass is preferably within the range from 6 to 15% by mass thereof, more preferably within the range from 7 to 14% by mass thereof, even more preferably within the range from 8 to 13% by mass thereof.

The relationship between cellulose nitrate used in the invention and the total mass of the components (A), (B) and (C) is not particularly limited. Preferably, the mass of cellulose nitrate is within the range from 80 to 160 parts by mass relative to 100 parts by mass of the whole of the components (A), (B) and (C). When cellulose nitrate is used in an amount in this range, light control particles having an even size can be formed. Additionally, when the particles are made into a light control material, an improvement can be made in the dispersibility of the light control particles in the light control suspension.

In order to yield, in particular, light control particles having a large aspect ratio, specifically, light control particles having an aspect ratio within the range of 3 to 8, a long diameter within the range of 225 to 625 nm and a particle diameter within the range of 135 to 220 nm, the particle diameter being obtained by particle size distribution measurement, the mass of cellulose nitrate is preferably within the range from 90 to 150 parts by mass, more preferably within the range from 100 to 145 parts by mass, even more preferably within the range from 105 to 140 parts by mass relative to 100 parts by mass of the whole of the components (A), (B) and (C).

As described in, for example, Patent Document 4 already, in a method for manufacturing light control particles, the amount of water present in the reaction system at the time of the manufacture produces strongly affects onto the particle size or shape of the manufactured light control particles. Thus, it is necessary to estimate precisely the amount of water contained in the elemental molecular iodine (A), the alkaline earth metal iodide (B), the heterocyclic compound (C), the organic solvent as the medium, methanol, and cellulose nitrate, and further gain experientially a water amount necessary for yielding light control particles having a preferred particle size and shape.

As described above, the total water amount necessary for yielding light control particles having a preferred particle size and shape can be experientially gained; when methanol is used in an amount in the range in the invention, the water amount for yielding, for example, light control particles having an aspect ratio within the range of 3 to 8, a long diameter within the range of 225 to 625 nm and a particle diameter within the range of 135 to 220 nm, the particle diameter being obtained by particle size distribution measurement, is preferably within the range from 7.5 to 9.6 parts by mass relative to 100 parts by mass of the whole of the components (A), (B) and (C).

The water amount for yielding, in particular, light control particles having a long diameter within the range of 250 to 550 nm and a particle diameter within the range of 140 to 210 nm, the particle diameter being obtained by particle size distribution measurement, is preferably within the range from 7.8 to 9.4 parts by mass relative to 100 parts by mass of the whole of the components (A), (B) and (C). The water amount for yielding light control particles having a long diameter within the range of 300 to 500 nm and a particle diameter of within the range 145 to 205 nm, the particle diameter being obtained by particle size distribution measurement, is more preferably within the range from 7.9 to 9.3 parts by mass relative to 100 parts by mass of the whole of the components (A), (B) and (C).

The water amount necessary for light control particles having a preferred particle size and shape can be calculated. Actually, however, it is difficult to analyze the amount of all water contained in the raw materials, the medium and others precisely. Additionally, the water amount is easily varied by the handling thereof in the air in the step of manufacturing operation; thus, it often occurs that even when the total water amount is made consistent with an experientially gained water amount, light control particles having a light control particle size different from anticipated one are yielded. A reason therefor is as follows: the amount of water present in the reaction system strongly affects onto the particle size or shape of the resultant light control particles; thus, even when a small error or difference is generated between the water amount gained by calculation and the actual water amount, a large effect is produced.

In the invention, it is essential that in the step of granulating after mixing the components (A), (B) and (C) with each other in a medium, reaction needs to be carried out in the presence of methanol. Specifically, it has been found out that methanol is used in an amount of 50 to 110 parts by mass relative to 100 parts by mass of the whole of the components (A), (B) and (C), thereby decreasing the effect of water so that light control particles can be stably manufactured. If the amount of methanol caused to coexist is less than 50 parts by mass relative to 100 parts by mass of the whole of components (A), (B) and (C), the effect of water tends to become large. By contrast, if the amount of methanol caused to coexist is more than 110 parts by mass relative to 100 parts by mass of the whole of components (A), (B) and (C), the aspect ratio of the particles tends to decrease.

For example, if the amount of methanol caused to coexist is out of the range in the invention, specifically, if the amount is within the range of 5 to 50 parts by mass relative to 100 parts by mass of the whole of the components (A), (B) and (C), it is necessary for yielding, for example, light control particles having an aspect ratio within the range of 3 to 8, a long diameter within the range of 225 to 625 nm and a particle diameter within the range of 135 to 220 nm, the particle diameter being obtained by particle size distribution measurement, to set the water amount into the range of 7.3 to 8.7 parts by mass relative to 100 parts by mass of the whole of the components (A), (B) and (C). Moreover, it is necessary for yielding light control particles having a long diameter within the range of 250 to 550 nm and a particle diameter within the range of 140 to 210 nm, the particle diameter being obtained by particle size distribution measurement, to set the water amount into the range of 7.4 to 8.6 parts by mass relative to 100 parts by mass of the whole of the components (A), (B) and (C). It is necessary for yielding light control particles having a long diameter within the range of 300 to 500 nm and a particle diameter within the range of 145 to 205 nm, the particle diameter being obtained by particle size distribution measurement, to set the water amount into the range of 7.5 to 8.5 parts by mass relative to 100 parts by mass of the whole of the components (A), (B) and (C). As is understandable from the necessary water amounts, it is understood that the effect of water is larger than when methanol is used in an amount in the range specified in the invention.

The method for manufacturing light control particles of the invention makes it possible to produce light control particles having a target particle size and/or a target shape stably than methods in the prior art when actual manufacturing steps therein are considered. The total water amount is experientially gained as described above, and the range thereof falls in the range of 3 to 15 parts by mass relative to 100 parts by mass of the whole of the components (A), (B) and (C) as described above. However, this amount is varied within the range in accordance with the ratio by mole between the components (A), (B) and (C), the concentrations thereof in the medium, and the amount of cellulose nitrate. The likelihood width thereof is 2% or less by mass.

The water amount necessary in the invention is an amount about which the following is also considered: water contained in the components (A), (B) and (C), cellulose nitrate, and the solvent used as the medium. This matter is specifically as follows: when these are each used as a hydrate, the water amount in the hydrate is also considered; when water is contained in the solvent, the water amount thereof is also considered; and it is preferred that the amount of water added to the reaction system is made equal to the amount obtained by deducting these water amounts from the necessary water amount.

In the step of granulating in the method for manufacturing light control particles of the invention, the reaction temperature is preferably within the range from 30 to 60° C., more preferably within the range from 33 to 55° C., even more preferably within the range from 35 to 50° C. The apparatus for heating and keeping the temperature is not particularly limited, and may be any one of a mantle heater, an oil bath and a water bath.

In the step of granulating in the method for manufacturing light control particles of the invention, the charging order of the individual components is not particularly limited. Preferably, the order is set not to generate any undissolved residue of each of the components, and set to make it possible to decrease the effect of heat of dissolution.

Light control particles yielded in the manufacturing method of the invention may be used for various purposes or articles in the same manner as in the prior art. Preferably, the particles are used as light control particles of a light control material for a light control film.

The light control film of the invention has a light control layer including a light control material containing: a resin matrix made from a polymeric medium that is cured by irradiating with an energy beam, and a light control suspension including a dispersing medium and light control particles that are dispersed in the dispersing medium so as to be in a flowing state. The light control film of the invention is preferably formed by sandwiching the light control layer between two transparent electroconductive substrates.

In the invention, the polymeric medium, which is cured by irradiating with an energy beam, is, for example, a polymeric composition curable by an energy beam, such as ultraviolet rays, visible rays, an electron beam. The polymeric composition is, for example, a polymeric composition comprising a polymeric compound having a substituent having an ethylenically unsaturated bond, and a polymerization initiator.

Preferred examples of the polymeric compound having a substituent having an ethylenically unsaturated bond include silicone resin, acrylic resin, and polyester resin from the viewpoint of easiness in the synthesis thereof, light control performance, endurance and others. It is preferred from the viewpoint of light control performance, endurance and others that the resins have, as a substituent, an alkyl group such as a methyl, ethyl, propyl, isopropyl, butyl, isobutyl, tert-butyl, amyl, isoamyl, hexyl or cyclohexyl group, or an aryl group such as a phenyl or naphthyl group.

In the case of using the polymeric compound having a substituent having an ethylenically unsaturated bond, a photopolymerization initiator that activates radical polymerization when exposed to an energy beam may be used.

In the invention, the dispersing medium in the light control suspension may be a medium that undergoes phase separation from the polymeric medium and a resin matrix which is a cured product thereof. The dispersing medium is preferably a liquid copolymer which: fulfils a function of dispersing the light control particles therein so as to be in a flowable state; adheres selectively onto the light control particles to cover the particles; acts so that the light control particles can shift into a droplet phase resulting from the phase separation, when the dispersing medium and the polymeric medium undergo phase separation from each other; has neither electroconductivity nor compatibility with the polymeric medium; and has a refractive index close to that of a resin matrix formed from the polymeric medium when the dispersing medium and the others are made into a light control film.

Preferred is, for example, a (meth)acrylic ester oligomer having a fluoro group and/or a hydroxyl group. More preferred is, for example, a (meth)acrylic ester oligomer having a fluoro group and a hydroxyl group. When the copolymer is used, the light control particles are easily dispersed in the light control suspension since a monomer unit of any one of the fluoro group and the hydroxyl group is affinitive with the light control particles and the other monomer unit acts in such a manner that the light control suspension can stably be maintained as a droplet in the polymeric medium. Thus, at the time of the phase separation, the light control particles are easily introduced into the phase-separated droplets.

Examples of the (meth)acrylic ester oligomer having a fluoro group and/or a hydroxyl group include 2,2,2-trifluoroethyl methacrylate/butyl acrylate/2-hydroxyethyl acrylate copolymer, 3,5,5-trimethylhexyl acrylate/2-hydroxypropyl acrylate/fumaric acid copolymer, butyl acrylate/2-hydroxyethyl acrylate copolymer, 2,2,3,3-tetrafluoropropyl acrylate/butyl acrylate/2-hydroxyethyl acrylate copolymer, 1H,1H,5H-octafluoropentyl acrylate/butyl acrylate/2-hydroxyethyl acrylate copolymer, 1H,1H,2H,2H-heptadecafluorodecyl acrylate/butyl acrylate/2-hydroxyethyl acrylate copolymer, 2,2,2-trifluoroethyl methacrylate/butyl acrylate/2-hydroxyethyl acrylate copolymer, 2,2,3,3-tetrafluoropropyl methacrylate/butyl acrylate/2-hydroxyethyl acrylate copolymer, 1H,1H,5H-octafuoropentyl methacrylate/butyl acrylate/2-hydroxyethyl acrylate copolymer, 1H-1H,2H,2H-heptadecafluorodecyl methacrylate/butyl acrylate/2-hydroxyethyl acrylate copolymer, butyl methacrylate/2-hydroxyethyl methacrylate copolymer, hexyl methacrylate/2-hydroxyethyl methacrylate copolymer, octyl methacrylate/2-hydroxyethyl methacrylate copolymer, decyl methacrylate/2-hydroxyethyl methacrylate copolymer, undecyl methacrylate/2-hydroxyethyl methacrylate copolymer, dodecyl methacrylate/2-hydroxyethyl methacrylate copolymer, tridecyl methacrylate/2-hydroxyethyl methacrylate copolymer, teteradecyl methacrylate/2-hydroxyethyl methacrylate copolymer, hexadecyl methacrylate/2-hydroxyethyl methacrylate copolymer, and octadecyl methacrylate/2-hydroxyethyl methacrylate copolymer.

The light control suspension in the invention contains the light control particles in an amount preferably within the range from 1 to 15% by mass of the whole of the light control suspension, more preferably within the range from 2 to 10% by mass thereof. Moreover, the light control suspension contains the dispersing medium in an amount preferably within the range from 30 to 99% by mass of the whole of the light control suspension, more preferably within the range from 50 to 96% by mass thereof.

The light control material contains the light control suspension in an amount preferably within the range from 1 to 100 parts by mass, more preferably within the range from 4 to 70 parts by mass, even more preferably within the range from 6 to 60 parts by mass, in particular preferably within the range from 8 to 50 parts by mass relative to 100 parts by mass of the polymeric medium.

The light control film of the invention may be manufactured, for example, by applying the above-mentioned light control material onto a transparent electroconductive substrate, irradiating the material with an energy beam to cure the polymeric medium therein, thereby forming a light control layer, and then causing a transparent electroconductive substrate to adhere closely onto the light control layer.

Specifically, a light control suspension is first produced as follows: a liquid wherein light control particles are dispersed in a solvent is mixed with a dispersing medium of the light control suspension, and then the solvent is distilled off by means of a rotary evaporator or the like.

Next, the light control suspension is mixed with a polymeric medium to prepare a mixed liquid (light control material) wherein the light control suspension is dispersed in the state of droplets in the polymeric medium. This mixed liquid is applied into a constant thickness onto a transparent electroconductive substrate. As the need arises, the solvent is dried and removed, and then a metal halide lamp, a high-pressure mercury lamp or the like is used to irradiate the workpiece with an energy beam, thereby curing the polymeric medium. As a result thereof, a film is yielded wherein the liquid light control suspension is dispersed in a droplet form in a resin matrix containing the cured polymeric medium. At this time, by changing the mixing ratio between the polymeric medium and the light control suspension variously, the light transmittance of the film can be adjusted.

Another transparent electroconductive substrate is caused to adhere closely onto the thus formed light control layer, thereby yielding a light control film. This transparent electroconductive substrate may be caused to adhere closely onto the light control layer before the irradiation with the energy beam, or may be caused to adhere closely onto the light control layer at the time of the irradiation with the energy beam. It is allowable to form a light control layer onto a surface of each of two transparent electroconductive substrates, and laminate the workpieces onto each other to cause their light control layers to adhere closely onto each other. The thickness of (each of) the light control layer(s) is preferably within the range from 5 to 1,000 μm, more preferably within the range from 20 to 100 μm.

Usable examples of the method for yielding the light control material, wherein the light control suspension is dispersed in the state of droplets in the polymeric medium, include a method of using a homogenizer, an ultrasonic homogenizer or the like to mix the light control suspension and the polymeric medium with each other to disperse the light control suspension finely; a phase separation method based on the polymerization of the polymeric compound component in the polymeric medium; a phase separation method based on solvent volatilization when the polymeric medium contains a solvent; and a phase separation method according to temperature.

In the method for applying the light control material into a constant thickness onto one or each of the transparent electroconductive substrates, an applying device, such as a bar coater, an applicator, a doctor blade, a roll coater, a die coater or a comma coater, is used to apply the material onto the transparent electroconductive substrate, or some other substrate. At the time of the application, the material may be diluted with an appropriate solvent as the need arises. When the solvent is used, it is necessary that after the material diluted with the solvent is applied onto the substrate, the workpiece is dried. The solvent may be, for example, tetrahydrofuran, toluene, heptane, cyclohexane, ethyl acetate, ethanol, methanol, isoamyl acetate, or hexyl acetate.

Each of the transparent electroconductive substrates may be, for example, a transparent substrate coated with a transparent electroconductive film made of ITO, $SnO_2$, $In_2O_3$ or the like. The light transmittance of the transparent electroconductive film is preferably 80% or more, and the thickness of the transparent electroconductive film is preferably within the range from 10 to 5,000 nm.

The light transmittance can be measured in accordance with total light transmittance measuring method in JIS K7105. The transparent substrate may be, for example, a glass piece or a polymeric film.

The glass piece means a substrate transparent to visible rays and others, and may be an ordinary glass piece made mainly of silicon dioxide, an inorganic material glass piece that may have various compositions, or a resin glass piece wherein a transparent organic material, such as acrylic resin or polycarbonate resin, is used.

The polymeric film is, for example, a resin film, such as a polyester film made of polyethylene terephthalate or some other polyester, a polyolefin film made of polypropylene or some other polyolefin, polyvinyl chloride film, an acrylic resin film, a polyethersulfone film, a polyarylate film, or a polycarbonate film. The polyethylene terephthalate film is preferred since the film is excellent in transparency, formability, adhesive property, workability and others. The thickness of each of the transparent substrates is not particularly limited. When the substrate is, for example, a glass piece, the thickness is preferably within the range from 1 to 15 mm. When the substrate is a polymeric film, the thickness is preferably within the range from 10 to 200 μm.

The surface resistance value of each of the transparent electroconductive substrates is preferably within the range from 3 to 600Ω. When the interval between the transparent electroconductive substrates is made narrow to manufacture a light control film, it is allowable for the prevention of a short circuit phenomenon generated by the incorporation of an alien substance thereinto to use substrates in each of which a transparent insulating layer having a thickness within the range of 200 to 1000 Å is formed on a transparent electroconductive film. In the case of forming a reflecting type light control window, such as a rear viewing mirror for a car, a thin film made of an electroconductive metal, such as gold or silver, which is a reflecting body, may be directly used as an electrode.

This method makes it possible to manufacture a light control film capable of adjusting the light transmittance thereof at will by the formation of an electric field.

In the light control film, the size of the droplets (average droplet diameter) of the light control suspension dispersed in the resin matrix is preferably within the range from 0.5 to 50 μm, more preferably within the range from 1 to 10 μm to prevent the aggregation and the sediment of the light control particles.

The average droplet diameter can be calculated, for example, by using an optical microscope to take a photograph or some other image of the light control film from the direction toward one of its surfaces, measuring the diameters of droplets (longest diameters of droplets) arbitrarily-selected from droplets therein, and then getting the average value thereof. The diameter can also be calculated by taking a viewing angle image of the light control film through an optical microscope, as digital data, into a computer, and then applying an image processing integration software thereto. The size of the droplets is decided by the concentrations of the individual components constituting the light control suspension, the viscosities of the light control suspension and the polymeric medium, the compatibility of the dispersing medium in the light control suspension with the polymeric medium, and others.

From the viewpoint of an improvement in the transmittance when the film is in a transparent state and an improvement in the vividness when the film is in a colored state, it is preferred that the refractive index of the liquid light control suspension is close to that of the polymeric medium, which is curable by irradiation with an energy beam.

Conditions for causing the film to exhibit light control performance are not particularly limited. Usually, an AC power supply is used to operate the film at 10 to 220 volts (effective value) and a frequency within the range of 30 Hz to 500 kHz.

The light control film of the invention can be preferably used for, e.g., an indoor or outdoor partition; a window glass or skylight for building; various flat display elements used in the electronic industry and for imaging-instruments; alternate products for various gauge boards and existing liquid crystal display elements; a light shutter; various indoor and outdoor advertisement and guide indicating boards; window glasses for an aircraft, a railway vehicle and a ship; window glasses, a back mirror and a sun roof for a car; glasses; sunglasses; a sun visor; and other articles.

The light control film of the invention may be directly used in a use method thereof. In accordance with the use purpose thereof, for example, the light control film of the invention may be used in the state that the film is sandwiched between two substrates, or in the state that the film is adhered onto a single surface of a substrate. The substrate(s) may (each) be, for example, a glass piece, or a polymeric film equivalent to the above-mentioned transparent substrates.

EXAMPLES

Example 1

From iodine (JIS extra pure reagent, manufactured by Wako Pure Chemical Industries, Ltd.) and isopentyl acetate (extra pure reagent, manufactured by Wako Pure Chemical Industries, Ltd.), an 8.47% by mass solution of iodine in isopentyl acetate was prepared, and further from cellulose nitrate, 1/4 LIG ((trade name) manufactured by Bergerac NC Co.), and isopentyl acetate, a 20.0% by mass solution of cellulose nitrate in isopentyl acetate was prepared.

Calcium iodide hydrate (for chemistry, manufactured by Wako Pure Chemical Industries, Ltd.) was heated and dried to be dehydrated. The resultant was dissolved into isopentyl acetate to prepare a 20.88% by mass calcium iodide solution. To a 300 mL four-necked flask, which was equipped with a stirrer and a condenser tube, were added 65.55 g of a iodine solution and 82.93 g of the cellulose nitrate solution. The flask was heated to set the temperature of a water bath into the range of 35 to 40° C. After the temperature of the contents in the flask turned into the range of 35 to 40° C., thereto were added 7.41 g of dehydrated methanol (extra pure reagent, manufactured by Wako Pure Chemical Industries, Ltd.) and 0.525 g of purified water (manufactured by Wako Pure Chemical Industries, Ltd.), and then the solution was stirred.

Thereto was added 15.6 g of the calcium iodide solution. Next, thereto was added 3.70 g of pyrazine-2,5-dicarboxylic acid (manufactured by Nikka Techno Service Co., Ltd.). The temperature of the water bath was set into the range of 42 to 44° C., and the solution was stirred for 4 hours. The system was then naturally cooled.

A HIRANUMA water content measuring device AQ-7 manufactured by Hiranuma Sangyo Co., Ltd. (generation liquid: Hydranal Aqualyte RS, and counter electrode liquid: Aqualyte CN) was used to measure the water content by percentage (%) in the cellulose nitrate solution. As a result, the content by percentage was 0.84%. The water amount in the cellulose nitrate solution was 0.697 g considering the mass of the added solution. The water amount present in the reaction system, which was regarded as the total of the water amount contained in cellulose nitrate and the amount of the added purified water, was 1.222 g.

In the present example, calcium iodide should have contained 0 to 1% by mass water even after heated and dried to be dehydrated since the compound had a strong hygroscopicity. However, a precise measurement of the water amount should have been difficult; thus, the water amount was not considered.

When the total mass of the components (A), (B) and (C), 12.51 g, was regarded as 100 parts by mass, the methanol amount was 59.2 parts by mass and the water amount was 9.77 parts by mass. About the resultant light control particles, the particle diameter obtained by a particle size distribution measurement was 139 nm, and the long axis and the aspect ratio, which were according to an SEM observation, were 259 nm in length and 4.1, respectively. Furthermore, the resultant synthesized liquid was centrifuged at 9260 G for 5 hours, and then the container was inclined to remove the supernatant. To the precipitate, which remained on the bottom, was added isopentyl acetate the amount of which was 5 times the mass of the precipitate, and then the precipitate was dispersed by ultrasonic waves. The mass of the whole of the liquid was then measured.

This liquid dispersion was weighed onto a metal plate by 1 g. The liquid was dried at 120° C. for 1 hour, and then the mass thereof was again measured. In this way, the nonvolatile matter content by percentage (%) was calculated. From this nonvolatile matter content by percentage and the mass of the whole of the liquid, the entire nonvolatile matter content, that is, the precipitate yield was obtained as a value of 4.15 g.

Example 2

Light control particles were manufactured in the same way as in Example 1 except that the amount of the added purified water was changed to 0.300 g and that of the added cellulose nitrate solution was changed to 83.05 g. The water amount in the cellulose nitrate solution was 0.673 g (water content by percentage: 0.81% by mass), and the water amount present in the reaction system was 0.973 g.

The methanol amount was 59.2 parts by mass relative to 100 parts by mass of the whole of the components (A), (B) and (C), and the water amount was 7.78 parts by mass. About the resultant light control particles, the particle diameter obtained by a particle size distribution measurement was 147 nm, and the long diameter and the aspect ratio, which were according to an SEM observation, were 307 nm and 4.5, respectively. The precipitate yield was 4.74 g.

Example 3

Light control particles were manufactured in the same way as in Example 1 except that the amount of the added purified water was changed to 0.375 g and that of the added cellulose nitrate solution was changed to 82.54 g. The water amount in the cellulose nitrate solution was 0.669 g (water content by percentage: 0.81% by mass), and the water amount present in the reaction system was 1.044 g.

The methanol amount was 59.2 parts by mass relative to 100 parts by mass of the whole of the components (A), (B) and (C), and the water amount was 8.34 parts by mass. About the resultant light control particles, the particle diameter obtained by a particle size distribution measurement was 162 nm, and the long diameter and the aspect ratio, which were according to an SEM observation, were 400 nm and 5.5, respectively. The precipitate yield was 5.76 g.

Example 4

Light control particles were manufactured in the same way as in Example 1 except that the amount of the added purified water was changed to 0.375 g and that of the added cellulose nitrate solution was changed to 82.89 g. The water amount in the cellulose nitrate solution was 0.671 g (water content by percentage: 0.81% by mass), and the water amount present in the reaction system was 1.046 g.

The methanol amount was 59.2 parts by mass relative to 100 parts by mass of the whole of the components (A), (B) and (C), and the water amount was 8.37 parts by mass. About the resultant light control particles, the particle diameter obtained by a particle size distribution measurement was 162 nm, and the long diameter and the aspect ratio, which were according to an SEM observation, were 400 nm and 5.2, respectively. The precipitate yield was 5.63 g.

Example 5

Light control particles were manufactured in the same way as in Example 1 except that the amount of the added purified water was changed to 0.450 g and that of the added cellulose nitrate solution was changed to 82.25 g. The water amount in the cellulose nitrate solution was 0.666 g (water content by percentage: 0.81% by mass), and the water amount present in the reaction system was 1.116 g.

The methanol amount was 59.2 parts by mass relative to 100 parts by mass of the whole of the components (A), (B) and (C), and the water amount was 8.92 parts by mass. About the resultant light control particles, the particle diameter obtained by a particle size distribution measurement was 200 nm, and the long diameter and the aspect ratio, which were according to an SEM observation, were 594 nm and 6.3, respectively. The precipitate yield was 7.41 g.

Example 6

Light control particles were manufactured in the same way as in Example 1 except that the amount of the added purified water was changed to 0.325 g and that of the added cellulose nitrate solution was changed to 83.13 g. The water amount in the cellulose nitrate solution was 0.798 g (water content by percentage: 0.96% by mass), and the water amount present in the reaction system was 1.123 g.

The methanol amount was 59.2 parts by mass relative to 100 parts by mass of the whole of the components (A), (B) and (C), and the water amount was 8.98 parts by mass. About the resultant light control particles, the particle diameter obtained by a particle size distribution measurement was 189 nm, and the long diameter and the aspect ratio, which were according to an SEM observation, were 384 nm and 5.3, respectively. The precipitate yield was 6.62 g.

Example 7

Light control particles were manufactured in the same way as in Example 1 except that the amount of the added purified water was changed to 0.525 g and that of the added cellulose nitrate solution was changed to 82.77 g. The water amount in the cellulose nitrate solution was 0.6709 g (water content by percentage: 0.81% by mass), and the water amount present in the reaction system was 1.195 g.

The methanol amount was 59.2 parts by mass relative to 100 parts by mass of the whole of the components (A), (B) and (C), and the water amount was 9.56 parts by mass. About the resultant light control particles, the particle diameter obtained by a particle size distribution measurement was 231 nm, and the long diameter and the aspect ratio, which were according to an SEM observation, were 581 nm and 6.9, respectively. The precipitate yield was 7.70 g.

Example 8

Calcium iodide hydrate was heated and dried to be dehydrated. The resultant was dissolved into isopentyl acetate and methanol to prepare a 20.88% by mass calcium iodide solution. At this time, the ratio by mass of isopentyl acetate to methanol was 2.0:3.0. To a 300 mL four-necked flask, which was equipped with a stirrer and a condenser tube, were added 65.55 g of a iodine solution and 82.71 g of a cellulose nitrate solution. The solution was then stirred.

The flask was heated to set temperature of a water bath into the range of 42 to 44° C. After the temperature of the contents in the flask turned into the range of 42 to 44° C., thereto was added 15.6 g of the calcium iodide solution without any addition of purified water. Next, thereto was added 3.70 g of pyrazine-2,5-dicarboxylic acid. The temperature of the water bath was set into the range of 42 to 44° C., and the solution was stirred for 2 hours. The system was then naturally cooled. The water amount in the cellulose nitrate solution was 0.695 g (water content by percentage: 0.84% by mass). The water amount present in the reaction system was 0.695 g.

When the total mass of the components (A), (B) and (C), 12.51 g, was regarded as 100 parts by mass, the methanol amount was 59.2 parts by mass and the water amount was 5.55 parts by mass. About the resultant light control particles, the particle diameter obtained by a particle size distribution measurement was 126 nm, and the long axis and the aspect ratio, which were according to an SEM observation, were 173 nm in length and 2.3, respectively.

Example 9

Light control particles were manufactured in the same way as in Example 8 except that the amount of the added purified water was changed to 0.325 g and that of the added cellulose nitrate solution was changed to 83.05 g. The water amount in the cellulose nitrate solution was 0.698 g (water content by percentage: 0.84% by mass), and the water amount present in the reaction system was 1.023 g.

The methanol amount was 59.2 parts by mass relative to 100 parts by mass of the whole of the components (A), (B) and (C), and the water amount was 8.17 parts by mass. About the resultant light control particles, the particle diameter obtained by a particle size distribution measurement was 155 nm, and the long diameter and the aspect ratio, which were according to an SEM observation, were 335 nm and 4.6, respectively. The precipitate yield was 6.37 g.

Example 10

Light control particles were manufactured in the same way as in Example 8 except that the amount of the added purified water was changed to 0.375 g and that of the added cellulose nitrate solution was changed to 82.78 g. The water amount in the cellulose nitrate solution was 0.695 g (water content by percentage: 0.84% by mass), and the water amount present in the reaction system was 1.070 g.

The methanol amount was 59.2 parts by mass relative to 100 parts by mass of the whole of the components (A), (B) and (C), and the water amount was 8.56 parts by mass. About the resultant light control particles, the particle diameter obtained by a particle size distribution measurement was 169 nm, and the long diameter and the aspect ratio, which were according to an SEM observation, were 348 nm and 4.8, respectively. The precipitate yield was 6.46 g.

Example 11

Light control particles were manufactured in the same way as in Example 8 except that the amount of the added purified water was changed to 0.375 g and that of the added cellulose nitrate solution was changed to 82.83 g. The water amount in the cellulose nitrate solution was 0.696 g (water content by percentage: 0.84% by mass), and the water amount present in the reaction system was 1.071 g.

The methanol amount was 59.2 parts by mass relative to 100 parts by mass of the whole of the components (A), (B) and (C), and the water amount was 8.56 parts by mass. About the resultant light control particles, the particle diameter obtained by a particle size distribution measurement was 167 nm, and the long diameter and the aspect ratio, which were according to an SEM observation, were 343 nm and 4.7, respectively. The precipitate yield was 6.49 g.

Example 12

Light control particles were manufactured in the same way as in Example 8 except that the amount of the added purified water was changed to 0.375 g and that of the added cellulose nitrate solution was changed to 83.18 g. The water amount in the cellulose nitrate solution was 0.699 g (water content by percentage: 0.84% by mass), and the water amount present in the reaction system was 1.074 g.

The methanol amount was 59.2 parts by mass relative to 100 parts by mass of the whole of the components (A), (B) and (C), and the water amount was 8.58 parts by mass. About the resultant light control particles, the particle diameter obtained by a particle size distribution measurement was 177 nm, and the long diameter and the aspect ratio, which were according to an SEM observation, were 402 nm and 5.1, respectively. The precipitate yield was 6.26 g.

Example 13

Light control particles were manufactured in the same way as in Example 8 except that the amount of the added purified water was changed to 0.375 g and that of the added cellulose nitrate solution was changed to 83.28 g. The water amount in the cellulose nitrate solution was 0.700 g (water content by percentage: 0.84% by mass), and the water amount present in the reaction system was 1.075 g.

The methanol amount was 59.2 parts by mass relative to 100 parts by mass of the whole of the components (A), (B) and (C), and the water amount was 8.59 parts by mass. About the resultant light control particles, the particle diameter obtained by a particle size distribution measurement was 178 nm, and the long diameter and the aspect ratio, which were according to an SEM observation, were 409 nm and 5.2, respectively. The precipitate yield was 6.55 g.

Example 14

Light control particles were manufactured in the same way as in Example 8 except that the amount of the added purified water was changed to 0.475 g and that of the added cellulose nitrate solution was changed to 82.59 g. The water amount in the cellulose nitrate solution was 0.694 g (water content by percentage: 0.84% by mass), and the water amount present in the reaction system was 1.169 g.

The methanol amount was 59.2 parts by mass relative to 100 parts by mass of the whole of the components (A), (B) and (C), and the water amount was 9.34 parts by mass. About the resultant light control particles, the particle diameter obtained by a particle size distribution measurement was 213 nm, and the long diameter and the aspect ratio, which were according to an SEM observation, were 505 nm and 5.6, respectively. The precipitate yield was 7.45 g.

Example 15

Light control particles were manufactured in the same way as in Example 1 except that the amount of the added purified water was changed to 0.375 g, that of the added cellulose nitrate solution was changed to 82.63 g, and that of dehydrated methanol was changed to 9.88 g. The water amount in the cellulose nitrate solution was 0.669 g (water content by percentage: 0.81% by mass), and the water amount present in the reaction system was 1.044 g.

The methanol amount was 79.0 parts by mass relative to 100 parts by mass of the whole of the components (A), (B) and (C), and the water amount was 8.35 parts by mass. About the resultant light control particles, the particle diameter obtained by a particle size distribution measurement was 159 nm, and the long diameter and the aspect ratio, which were according to an SEM observation, were 382 nm and 5.0, respectively. The precipitate yield was 5.59 g.

Example 16

Light control particles were manufactured in the same way as in Example 1 except that the amount of the added purified water was changed to 0.450 g, that of the added cellulose nitrate solution was changed to 82.59 g, and that of dehydrated methanol was changed to 9.88 g. The water amount in the cellulose nitrate solution was 0.669 g (water content by percentage: 0.81% by mass), and the water amount present in the reaction system was 1.119 g.

The methanol amount was 79.0 parts by mass relative to 100 parts by mass of the whole of the components (A), (B) and (C), and the water amount was 8.95 parts by mass. About the resultant light control particles, the particle diameter obtained by a particle size distribution measurement was 183 nm, and the long diameter and the aspect ratio, which were according to an SEM observation, were 462 nm and 5.3, respectively. The precipitate yield was 6.78 g.

Example 17

Light control particles were manufactured in the same way as in Example 1 except that the amount of the added purified water was changed to 0.300 g, that of the added cellulose nitrate solution was changed to 83.21 g, and that of dehydrated methanol was changed to 12.35 g. The water amount in the cellulose nitrate solution was 0.649 g (water content by percentage: 0.78% by mass), and the water amount present in the reaction system was 0.949 g.

The methanol amount was 98.7 parts by mass relative to 100 parts by mass of the whole of the components (A), (B) and (C), and the water amount was 7.59 parts by mass. About the resultant light control particles, the particle diameter obtained by a particle size distribution measurement was 139 nm, and the long diameter and the aspect ratio, which were according to an SEM observation, were 242 nm and 3.1, respectively. The precipitate yield was 5.38 g.

Example 18

Light control particles were manufactured in the same way as in Example 1 except that the amount of the added purified water was changed to 0.375 g, that of the added cellulose nitrate solution was changed to 83.25 g, and that of dehydrated methanol was changed to 12.35 g. The water amount in the cellulose nitrate solution was 0.649 g (water content by percentage: 0.78% by mass), and the water amount present in the reaction system was 1.024 g.

The methanol amount was 98.7 parts by mass relative to 100 parts by mass of the components (A), (B) and (C), and the water amount was 8.19 parts by mass. About the resultant light control particles, the particle diameter obtained by a particle size distribution measurement was 149 nm, and the long diameter and the aspect ratio, which were according to an SEM observation, were 232 nm and 3.0, respectively. The precipitate yield was 5.47 g.

Example 19

Light control particles were manufactured in the same way as in Example 1 except that the amount of the added purified water was changed to 0.450 g, that of the added cellulose nitrate solution was changed to 82.89 g, and that of dehydrated methanol was changed to 12.35 g. The water amount in the cellulose nitrate solution was 0.647 g (water content by percentage: 0.78% by mass), and the water amount present in the reaction system was 1.097 g.

The methanol amount was 98.7 parts by mass relative to 100 parts by mass of the components (A), (B) and (C), and the water amount was 8.77 parts by mass. About the resultant Eight control particles, the particle diameter obtained by a particle size distribution measurement was 174 nm, and the long diameter and the aspect ratio, which were according to an SEM observation, were 351 nm and 4.1, respectively. The precipitate yield was 6.79 g.

Example 20

Light control particles were manufactured in the same way as in Example 1 except that the amount of the added purified water was changed to 0.525 g, that of the added cellulose nitrate solution was changed to 82.96 g, and that of dehydrated methanol was changed to 12.35 g. The water amount in the cellulose nitrate solution was 0.672 g (water content by percentage: 0.81% by mass), and the water amount present in the reaction system was 1.197 g.

The methanol amount was 98.7 parts by mass relative to 100 parts by mass of the components (A), (B) and (C), and the water amount was 9.57 parts by mass. About the resultant light control particles, the particle diameter obtained by a particle size distribution measurement was 213 nm, and the long diameter and the aspect ratio, which were according to an SEM observation, were 607 nm and 5.6, respectively. The precipitate yield was 6.98 g.

Comparative Example 1

Light control particles were manufactured in the same way as in Example 1 except that no purified water was added and further the amount of the added cellulose nitrate solution was changed to 82.78 g, and that of dehydrated methanol was changed to 2.47 g. The water amount in the cellulose nitrate solution was 0.671 g (water content by percentage: 0.81% by mass), and the water amount present in the reaction system was 0.671 g.

The methanol amount was 19.7 parts by mass relative to 100 parts by mass of the components (A), (B) and (C), and the water amount was 5.36 parts by mass. About the resultant light control particles, the particle diameter obtained by a particle size distribution measurement was 86 nm, and the long diameter and the aspect ratio, which were according to an SEM observation, were 114 nm and 1.6, respectively. The precipitate yield was 1.73 g.

Comparative Example 2

Light control particles were manufactured in the same way as in Example 1 except that the amount of the added purified water was changed to 0.300 g, that of the added cellulose nitrate solution was changed to 82.78 g, and that of dehydrated methanol was changed to 2.47 g. The water amount in the cellulose nitrate solution was 0.646 g (water content by percentage: 0.78% by mass), and the water amount present in the reaction system was 0.946 g.

The methanol amount was 19.7 parts by mass relative to 100 parts by mass of the components (A), (B) and (C), and the water amount was 7.56 parts by mass. About the resultant light control particles, the particle diameter obtained by a particle size distribution measurement was 144 nm, and the long diameter and the aspect ratio, which were according to an SEM observation, were 308 nm and 4.0, respectively. The precipitate yield was 3.76 g.

Comparative Example 3

Light control particles were manufactured in the same way as in Example 1 except that the amount of the added purified water was changed to 0.375 g, that of the added cellulose nitrate solution was changed to 82.48 g, and that of dehydrated methanol was changed to 2.47 g. The water amount in the cellulose nitrate solution was 0.602 g (water content by percentage: 0.73% by mass), and the water amount present in the reaction system was 0.977 g.

The methanol amount was 19.7 parts by mass relative to 100 parts by mass of the components (A), (B) and (C), and the water amount was 7.81 parts by mass. About the resultant light control particles, the particle diameter obtained by a particle size distribution measurement was 173 nm, and the long diameter and the aspect ratio, which were according to an SEM observation, were 397 nm and 5.1, respectively. The precipitate yield was 5.96 g.

Comparative Example 4

Light control particles were manufactured in the same way as in Example 1 except that the amount of the added purified water was changed to 0.375 g, that of the added cellulose nitrate solution was changed to 82.71 g, and that of dehydrated methanol was changed to 2.47 g. The water amount in the cellulose nitrate solution was 0.604 g (water content by percentage: 0.73% by mass), and the water amount present in the reaction system was 0.979 g.

The methanol amount was 19.7 parts by mass relative to 100 parts by mass of the components (A), (B) and (C), and the water amount was 7.82 parts by mass. About the resultant light control particles, the particle diameter obtained by a particle size distribution measurement was 166 nm, and the long diameter and the aspect ratio, which were according to an SEM observation, were 370 nm and 5.3, respectively. The precipitate yield was 4.93 g.

Comparative Example 5

Light control particles were manufactured in the same way as in Example 1 except that the amount of the added purified water was changed to 0.375 g, that of the added cellulose nitrate solution was changed to 82.85 g, and that of dehydrated methanol was changed to 2.47 g. The water amount in the cellulose nitrate solution was 0.605 g (water content by percentage: 0.73% by mass), and the water amount present in the reaction system was 0.980 g.

The methanol amount was 19.7 parts by mass relative to 100 parts by mass of the components (A), (B) and (C), and the water amount was 7.83 parts by mass. About the resultant light control particles, the particle diameter obtained by a particle size distribution measurement was 169 nm, and the long diameter and the aspect ratio, which were according to an SEM observation, were 378 nm and 5.2, respectively. The precipitate yield was 4.98 g.

Comparative Example 6

Light control particles were manufactured in the same way as in Example 1 except that the amount of the added purified water was changed to 0.375 g, that of the added cellulose nitrate solution was changed to 82.89 g, and that of dehydrated methanol was changed to 2.47 g. The water amount in the cellulose nitrate solution was 0.605 g (water content by percentage: 0.73% by mass), and the water amount present in the reaction system was 0.980 g.

The methanol amount was 19.7 parts by mass relative to 100 parts by mass of the components (A), (B) and (C), and the water amount was 7.84 parts by mass. About the resultant light control particles, the particle diameter obtained by a particle size distribution measurement was 170 nm, and the long diameter and the aspect ratio, which were according to an SEM observation, were 401 nm and 4.9, respectively. The precipitate yield was 4.35 g.

Comparative Example 7

Light control particles were manufactured in the same way as in Example 1 except that the amount of the added purified water was changed to 0.375 g, that of the added cellulose nitrate solution was changed to 83.10 g, and that of dehydrated methanol was changed to 2.47 g. The water amount in the cellulose nitrate solution was 0.607 g (water content by percentage: 0.73% by mass), and the water amount present in the reaction system was 0.982 g.

The methanol amount was 19.7 parts by mass relative to 100 parts by mass of the components (A), (B) and (C), and the water amount was 7.85 parts by mass. About the resultant light control particles, the particle diameter obtained by a particle size distribution measurement was 161 nm, and the long diameter and the aspect ratio, which were according to an SEM observation, were 376 nm and 5.4, respectively. The precipitate yield was 4.13 g.

Comparative Example 8

Light control particles were manufactured in the same way as in Example 1 except that the amount of the added purified water was changed to 0.375 g, that of the added cellulose nitrate solution was changed to 82.84 g, and that of dehydrated methanol was changed to 2.47 g. The water amount in the cellulose nitrate solution was 0.621 g (water content by percentage: 0.75% by mass), and the water amount present in the reaction system was 0.996 g.

The methanol amount was 19.7 parts by mass relative to 100 parts by mass of the components (A), (B) and (C), and the water amount was 7.96 parts by mass. About the resultant light control particles, the particle diameter obtained by a particle size distribution measurement was 180 nm, and the long diameter and the aspect ratio, which were according to an SEM observation, were 401 nm and 4.7, respectively. The precipitate yield was 7.09 g.

Comparative Example 9

Light control particles were manufactured in the same way as in Example 1 except that the amount of the added purified water was changed to 0.375 g, that of the added cellulose nitrate solution was changed to 82.31 g, and that of dehydrated methanol was changed to 2.47 g. The water amount in the cellulose nitrate solution was 0.626 g (water content by percentage: 0.76% by mass), and the water amount present in the reaction system was 1.001 g.

The methanol amount was 19.7 parts by mass relative to 100 parts by mass of the components (A), (B) and (C), and the water amount was 8.00 parts by mass. About the resultant light control particles, the particle diameter obtained by a particle size distribution measurement was 165 nm, and the long diameter and the aspect ratio, which were according to an SEM observation, were 366 nm and 4.1, respectively. The precipitate yield was 6.26 g.

Comparative Example 10

Light control particles were manufactured in the same way as in Example 1 except that the amount of the added purified water was changed to 0.375 g, that of the added cellulose nitrate solution was changed to 82.94 g, and that of dehydrated methanol was changed to 2.47 g. The water amount in the cellulose nitrate solution was 0.647 g (water content by percentage: 0.78% by mass), and the water amount present in the reaction system was 1.022 g.

The methanol amount was 19.7 parts by mass relative to 100 parts by mass of the components (A), (B) and (C), and the water amount was 8.17 parts by mass. About the resultant light control particles, the particle diameter obtained by a particle size distribution measurement was 187 nm, and the long diameter and the aspect ratio, which were according to an SEM observation, were 436 nm and 5.3, respectively. The precipitate yield was 7.04 g.

Comparative Example 11

Light control particles were manufactured in the same way as in Example 1 except that the amount of the added purified water was changed to 0.375 g, that of the added cellulose nitrate solution was changed to 82.96 g, and that of dehydrated methanol was changed to 2.47 g. The water amount in the cellulose nitrate solution was 0.647 g (water content by percentage: 0.78% by mass), and the water amount present in the reaction system was 1.022 g.

The methanol amount was 19.7 parts by mass relative to 100 parts by mass of the components (A), (B) and (C), and the water amount was 8.17 parts by mass. About the resultant light control particles, the particle diameter obtained by a particle size distribution measurement was 183 nm, and the long diameter and the aspect ratio, which were according to an SEM observation, were 423 nm and 4.7, respectively. The precipitate yield was 6.92 g.

Comparative Example 12

Light control particles were manufactured in the same way as in Example 1 except that the amount of the added purified water was changed to 0.375 g, that of the added cellulose nitrate solution was changed to 82.69 g, and that of dehydrated methanol was changed to 2.47 g. The water amount in the cellulose nitrate solution was 0.645 g (water content by percentage: 0.78% by mass), and the water amount present in the reaction system was 1.020 g.

The methanol amount was 19.7 parts by mass relative to 100 parts by mass of the components (A), (B) and (C), and the water amount was 8.15 parts by mass. About the resultant light control particles, the particle diameter obtained by a particle size distribution measurement was 190 nm, and the long diameter and the aspect ratio, which were according to an SEM observation, were 476 nm and 5.0, respectively. The precipitate yield was 7.35 g.

Comparative Example 13

Light control particles were manufactured in the same way as in Example 1 except that the amount of the added purified water was changed to 0.375 g, that of the added cellulose nitrate solution was changed to 82.58 g, and that of dehydrated methanol was changed to 2.47 g. The water amount in the cellulose nitrate solution was 0.644 g (water content by percentage: 0.78% by mass), and the water amount present in the reaction system was 1.019 g.

The methanol amount was 19.7 parts by mass relative to 100 parts by mass of the components (A), (B) and (C), and the water amount was 8.15 parts by mass. About the resultant light control particles, the particle diameter obtained by a particle size distribution measurement was 173 nm, and the long diameter and the aspect ratio, which were according to an SEM observation, were 412 nm and 5.4, respectively. The precipitate yield was 6.60 g.

Comparative Example 14

Light control particles were manufactured in the same way as in Example 1 except that the amount of the added purified water was changed to 0.375 g, that of the added cellulose nitrate solution was changed to 82.47 g, and that of dehydrated methanol was changed to 2.47 g. The water amount in the cellulose nitrate solution was 0.643 g (water content by percentage: 0.78% by mass), and the water amount present in the reaction system was 1.018 g.

The methanol amount was 19.7 parts by mass relative to 100 parts by mass of the components (A), (B) and (C), and the water amount was 8.14 parts by mass. About the resultant light control particles, the particle diameter obtained by a particle size distribution measurement was 185 nm, and the long diameter and the aspect ratio, which were according to an SEM observation, were 454 nm and 4.8, respectively. The precipitate yield was 7.21 g.

Comparative Example 15

Light control particles were manufactured in the same way as in Example 1 except that the amount of the added purified water was changed to 0.375 g, that of the added cellulose nitrate solution was changed to 83.14 g, and that of dehydrated methanol was changed to 2.47 g. The water amount in the cellulose nitrate solution was 0.648 g (water content by percentage: 0.78% by mass), and the water amount present in the reaction system was 1.023 g.

The methanol amount was 19.7 parts by mass relative to 100 parts by mass of the components (A), (B) and (C), and the water amount was 8.18 parts by mass. About the resultant light control particles, the particle diameter obtained by a particle size distribution measurement was 170 nm, and the long diameter and the aspect ratio, which were according to an SEM observation, were 390 nm and 5.1, respectively. The precipitate yield was 6.37 g.

Comparative Example 16

Light control particles were manufactured in the same way as in Example 1 except that the amount of the added purified water was changed to 0.375 g, that of the added cellulose nitrate solution was changed to 83.85 g, and that of dehydrated methanol was changed to 2.47 g. The water amount in the cellulose nitrate solution was 0.654 g (water content by percentage: 0.78% by mass), and the water amount present in the reaction system was 1.029 g.

The methanol amount was 19.7 parts by mass relative to 100 parts by mass of the components (A), (B) and (C), and the water amount was 8.23 parts by mass. About the resultant light control particles, the particle diameter obtained by a particle size distribution measurement was 190 nm, and the long diameter and the aspect ratio, which were according to an SEM observation, were 462 nm and 5.6, respectively. The precipitate yield was 7.15 g.

Comparative Example 17

Light control particles were manufactured in the same way as in Example 1 except that the amount of the added purified water was changed to 0.375 g, that of the added cellulose nitrate solution was changed to 83.05 g, and that of dehydrated methanol was changed to 2.47 g. The water amount in the cellulose nitrate solution was 0.673 g (water content by percentage: 0.81% by mass), and the water amount present in the reaction system was 1.048 g.

The methanol amount was 19.7 parts by mass relative to 100 parts by mass of the components (A), (B) and (C), and the water amount was 8.38 parts by mass. About the resultant light control particles, the particle diameter obtained by a particle size distribution measurement was 198 nm, and the long diameter and the aspect ratio, which were according to an SEM observation, were 455 nm and 5.6, respectively. The precipitate yield was 6.76 g.

Comparative Example 18

Light control particles were manufactured in the same way as in Example 1 except that the amount of the added purified water was changed to 0.450 g, that of the added cellulose nitrate solution was changed to 83.17 g, and that of dehydrated methanol was changed to 2.47 g. The water amount in the cellulose nitrate solution was 0.674 g (water content by percentage: 0.81% by mass), and the water amount present in the reaction system was 1.124 g.

The methanol amount was 19.7 parts by mass relative to 100 parts by mass of the components (A), (B) and (C), and the water amount was 8.98 parts by mass. About the resultant light control particles, the particle diameter obtained by a particle size distribution measurement was 252 nm, and the long diameter and the aspect ratio, which were according to an SEM observation, were 645 nm and 7.1, respectively. The precipitate yield was 7.61 g.

Comparative Example 19

Light control particles were manufactured in the same way as in Example 1 except that the amount of the added purified water was changed to 0.525 g, that of the added cellulose nitrate solution was changed to 83.09 g, and that of dehydrated methanol was changed to 2.47 g. The water amount in the cellulose nitrate solution was 0.673 g (water content by percentage: 0.81% by mass), and the water amount present in the reaction system was 1.198 g.

The methanol amount was 19.7 parts by mass relative to 100 parts by mass of the components (A), (B) and (C), and the water amount was 9.58 parts by mass. About the resultant light control particles, the particle diameter obtained by a particle size distribution measurement was 260 nm, and the long diameter and the aspect ratio, which were according to an SEM observation, were 689 nm and 5.5, respectively. The precipitate yield was 7.50 g.

Comparative Example 20

Light control particles were manufactured in the same way as in Example 1 except that the amount of the added purified water was changed to 0.375 g, that of the added cellulose nitrate solution was changed to 82.88 g, and that of dehydrated methanol was changed to 4.94 g. The water amount in the cellulose nitrate solution was 0.603 g (water content by percentage: 0.73% by mass), and the water amount present in the reaction system was 0.980 g.

The methanol amount was 39.5 parts by mass relative to 100 parts by mass of the components (A), (B) and (C), and the water amount was 7.83 parts by mass. About the resultant light control particles, the particle diameter obtained by a particle size distribution measurement was 181 nm, and the long diameter and the aspect ratio, which were according to an SEM observation, were 466 nm and 5.4, respectively. The precipitate yield was 6.64 g.

Comparative Example 21

Light control particles were manufactured in the same way as in Example 1 except that the amount of the added purified water was changed to 0.375 g, that of the added cellulose nitrate solution was changed to 83.19 g, and that of dehydrated methanol was changed to 4.94 g. The water amount in the cellulose nitrate solution was 0.624 g (water content by percentage: 0.75% by mass), and the water amount present in the reaction system was 0.999 g.

The methanol amount was 39.5 parts by mass relative to 100 parts by mass of the components (A), (B) and (C), and the water amount was 7.99 parts by mass. About the resultant light control particles, the particle diameter obtained by a particle size distribution measurement was 184 nm, and the long diameter and the aspect ratio, which were according to an SEM observation, were 409 nm and 4.8, respectively. The precipitate yield was 6.80 g.

Comparative Example 22

Light control particles were manufactured in the same way as in Example 1 except that the amount of the added purified water was changed to 0.525 g, that of the added cellulose nitrate solution was changed to 82.60 g, and that of dehydrated methanol was changed to 4.94 g. The water amount in the cellulose nitrate solution was 0.605 g (water content by percentage: 0.73% by mass), and the water amount present in the reaction system was 1.128 g.

The methanol amount was 39.5 parts by mass relative to 100 parts by mass of the components (A), (B) and (C), and the water amount was 9.02 parts by mass. About the resultant light control particles, the particle diameter obtained by a particle size distribution measurement was 261 nm, and the long diameter and the aspect ratio, which were according to an SEM observation, were 851 nm and 7.3, respectively. The precipitate yield was 7.48 g.

Comparative Example 23

Light control particles were manufactured in the same way as in Example 1 except that the amount of the added purified water was changed to 0.375 g, that of the added cellulose nitrate solution was changed to 83.46 g, and that of dehydrated methanol was changed to 24.69 g. The water amount in the cellulose nitrate solution was 0.651 g (water content by percentage: 0.78% by mass), and the water amount present in the reaction system was 1.026 g.

The methanol amount was 197.4 parts by mass relative to 100 parts by mass of the components (A), (B) and (C), and the water amount was 8.201 parts by mass. About the resultant light control particles, the particle diameter obtained by a particle size distribution measurement was 300 nm, and the long diameter and the aspect ratio, which were according to an SEM observation, were 386 nm and 2.4, respectively. The precipitate yield was 4.05 g.

The results of Examples 1 to 20 and Comparative Examples 1 to 23 are shown in Table 1. As understood from Table 1, the use of methanol in an appropriate amount within the range specified by the invention makes it possible to decrease the effect of water onto the size of the resultant particles.

Figure 1:
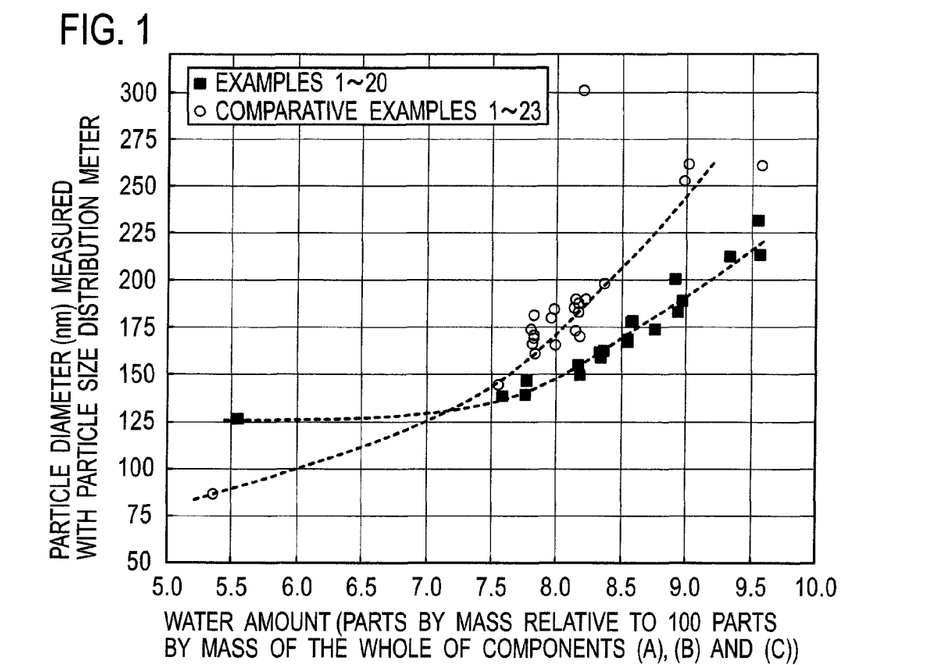
FIG. 1 is a graph showing a relationship between particle diameters obtained by particle size distribution measurements and water amounts.

In a graph of FIG. 1 is shown a relationship between the water amounts in the Examples and the Comparative Examples and the particle diameters therein obtained by the particle size distribution measurements. In a graph of FIG. 3 is shown a relationship between the yields therein and the particle diameters obtained by the particle size distribution measurements.

Figure 2:
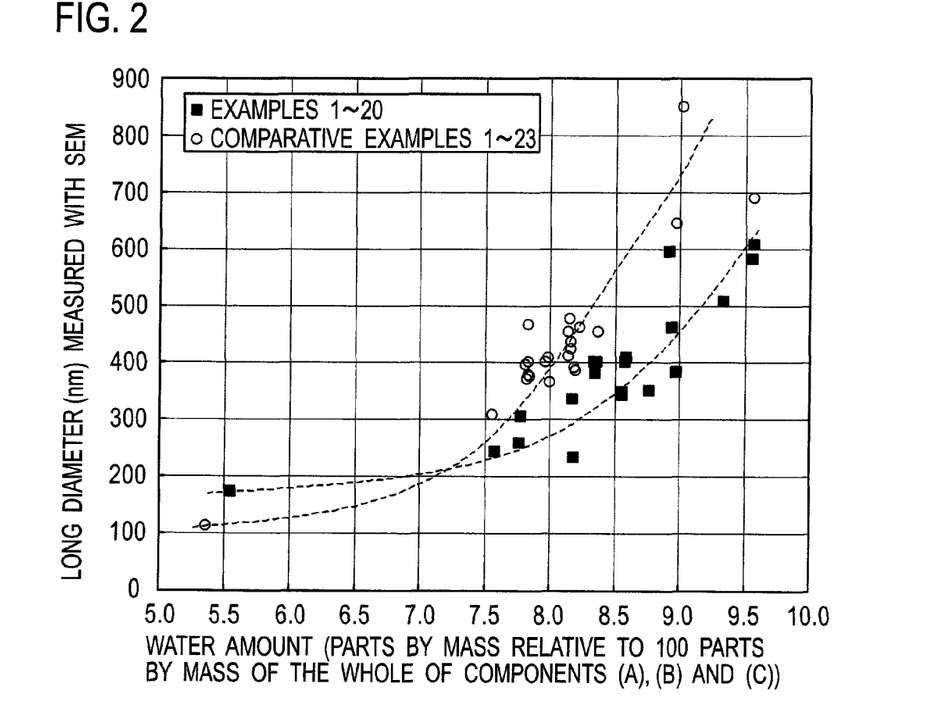
FIG. 2 is a graph showing a relationship between particle diameters each obtained by means of an SEM and water amounts.

In a graph of FIG. 2 is shown a relationship between the water amounts in the Examples and the Comparative Examples and the long diameters therein measured by means of the SEM. In a graph of FIG. 4 is shown a relationship between the yields therein and the long diameters measured by means of the SEM.

Figure 3:
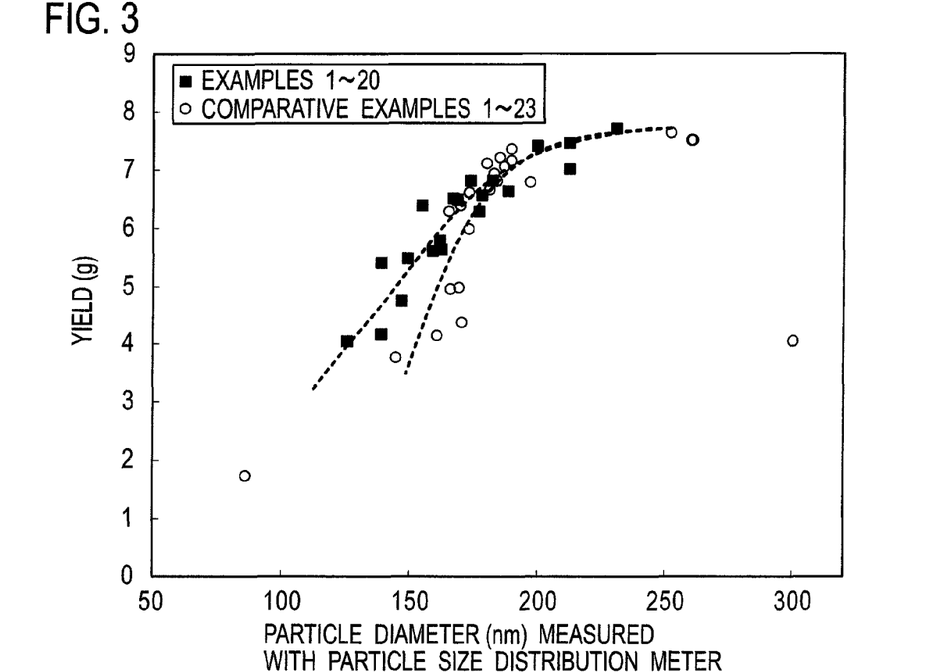
FIG. 3 is a graph showing a relationship between the particle diameters each obtained by the particle size distribution measurements and yields.
Figure 4:
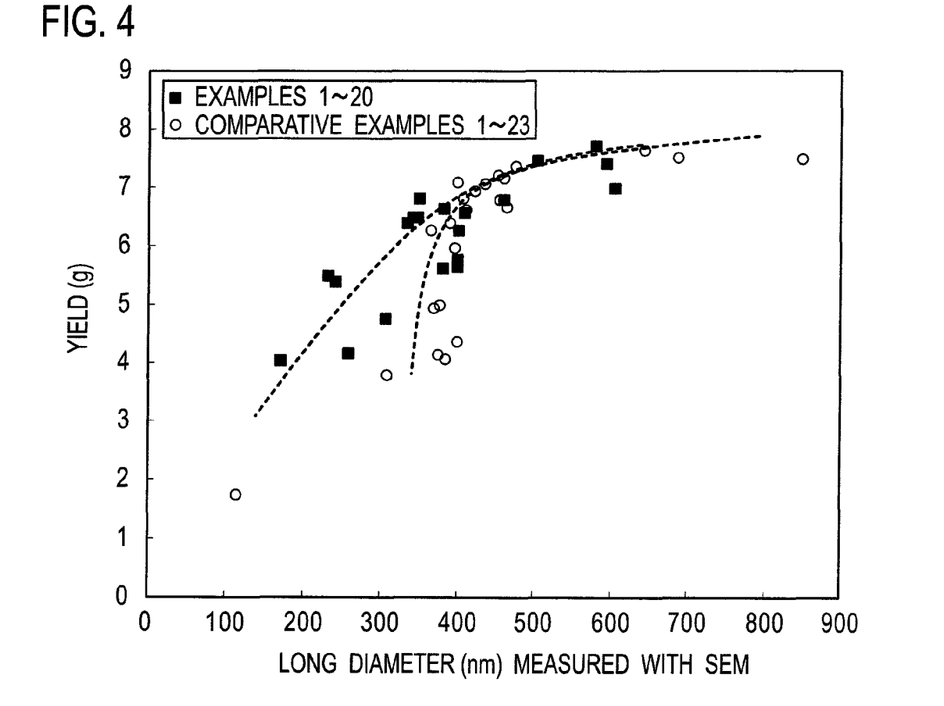
FIG. 4 is a graph showing a relationship between the particle diameters each obtained by means of the SEM and yields.

As understood from FIGS. 3 and 4, the use of methanol in an appropriate amount within the range specified by the invention makes it possible to yield particles having a desired size (in particular, a particle diameter within the range of 135 to 220 nm, the particle diameter being obtained by particle size distribution measurement, and a long diameter within the range of 225 to 625 nm, the long diameter being measured by means of an SEM) with a better yield than the use of methanol in an amount out of the range specified by the invention.

TABLE 1

| Item | Methanol amount (parts by mass) (ratio by mass) | Water amount (part by mass) (ratio by mass) | Particle diameter measured with particle size distribution (nm) | Measured with SEM Long diameter (nm) | Aspect ratio | Yield (g) |
| --- | --- | --- | --- | --- | --- | --- |
| Example 1 | 59.2 | 9.75 | 139 | 259 | 4.1 | 4.15 |
| Example 2 | 59.2 | 7.78 | 147 | 307 | 4.5 | 4.74 |
| Example 3 | 59.2 | 8.34 | 162 | 400 | 5.5 | 5.76 |
| Example 4 | 59.2 | 8.37 | 162 | 400 | 5.2 | 5.63 |
| Example 5 | 59.2 | 8.92 | 200 | 594 | 6.3 | 7.41 |
| Example 6 | 59.2 | 8.98 | 189 | 384 | 5.3 | 6.62 |
| Example 7 | 59.2 | 9.56 | 231 | 581 | 6.9 | 7.70 |
| Example 8 | 59.2 | 5.55 | 126 | 173 | 2.3 | 4.02 |
| Example 9 | 59.2 | 8.17 | 155 | 335 | 4.6 | 6.37 |
| Example 10 | 59.2 | 8.56 | 169 | 348 | 4.8 | 6.46 |
| Example 11 | 59.2 | 8.56 | 167 | 343 | 4.7 | 6.49 |
| Example 12 | 59.2 | 8.58 | 177 | 402 | 5.1 | 6.26 |
| Example 13 | 59.2 | 8.59 | 178 | 409 | 5.2 | 6.55 |
| Example 14 | 59.2 | 9.34 | 213 | 505 | 5.6 | 7.45 |
| Example 15 | 79.0 | 8.35 | 159 | 382 | 5.0 | 5.59 |
| Example 16 | 79.0 | 8.94 | 183 | 462 | 5.3 | 6.78 |
| Example 17 | 98.7 | 7.59 | 139 | 242 | 3.1 | 5.38 |
| Example 18 | 98.7 | 8.19 | 149 | 232 | 3.0 | 5.47 |
| Example 19 | 98.7 | 8.77 | 174 | 351 | 4.1 | 6.79 |
| Example 20 | 98.7 | 9.57 | 213 | 607 | 5.6 | 6.98 |
| Comparative Example 1 | 19.7 | 5.36 | 86 | 114 | 1.6 | 1.73 |
| Comparative Example 2 | 19.7 | 7.56 | 144 | 308 | 4.0 | 3.76 |
| Comparative Example 3 | 19.7 | 7.81 | 173 | 397 | 5.1 | 5.96 |
| Comparative Example 4 | 19.7 | 7.82 | 166 | 370 | 5.3 | 4.93 |
| Comparative Example 5 | 19.7 | 7.83 | 169 | 378 | 5.2 | 4.98 |
| Comparative Example 6 | 19.7 | 7.84 | 170 | 401 | 4.9 | 4.35 |
| Comparative Example 7 | 19.7 | 7.85 | 161 | 376 | 5.4 | 4.13 |
| Comparative Example 8 | 19.7 | 7.96 | 180 | 401 | 4.7 | 7.09 |
| Comparative Example 9 | 19.7 | 8.00 | 165 | 366 | 4.1 | 6.26 |
| Comparative Example 10 | 19.7 | 8.17 | 187 | 436 | 5.3 | 7.04 |
| Comparative Example 11 | 19.7 | 8.17 | 183 | 423 | 4.7 | 6.92 |
| Comparative Example 12 | 19.7 | 8.15 | 190 | 476 | 5.0 | 7.35 |
| Comparative Example 13 | 19.7 | 8.15 | 173 | 412 | 5.4 | 6.60 |
| Comparative Example 14 | 19.7 | 8.14 | 185 | 454 | 4.8 | 7.21 |
| Comparative Example 15 | 19.7 | 8.18 | 170 | 390 | 5.1 | 6.37 |
| Comparative Example 16 | 19.7 | 8.23 | 190 | 462 | 5.6 | 7.15 |
| Comparative Example 17 | 19.7 | 8.38 | 198 | 455 | 5.6 | 6.76 |
| Comparative Example 18 | 19.7 | 8.98 | 252 | 645 | 7.1 | 7.61 |
| Comparative Example 19 | 19.7 | 9.58 | 260 | 689 | 5.5 | 7.50 |
| Comparative Example 20 | 39.5 | 7.83 | 181 | 466 | 5.4 | 6.64 |
| Comparative Example 21 | 39.5 | 7.99 | 184 | 409 | 4.8 | 6.80 |
| Comparative Example 22 | 39.5 | 9.02 | 261 | 851 | 7.3 | 7.48 |
| Comparative Example 23 | 197.4 | 8.20 | 300 | 386 | 2.4 | 4.05 |

Industrial Applicability

According to the invention, it is possible to provide a method for manufacturing light control particles wherein the effect of water is decreased in a step of granulating of the method in order to yield effectively light control particles having a particle size and shape optimal for light control material and further a good reproducibility is attained.

The invention claimed is:

1. A method for manufacturing light control particles usable for a light control material comprising:
   a resin matrix made from a polymeric medium that is cured by irradiating with an energy beam; and
   a light control suspension comprising: a dispersing medium; and the light control particles that are dispersed in the dispersing medium so as to be in a flowing state,
   the method comprising the step of granulating after mixing elemental molecular iodine (A), an alkaline earth metal iodide (B), and a heterocyclic compound (C) with each other in a medium,
   wherein in the step of granulating, reaction is carried out in the presence of methanol in an amount of not less than 50 parts by mass but not more than 110 parts by mass relative to 100 parts by mass of the whole of components (A), (B) and (C), and
   wherein the heterocyclic compound (C) is a compound represented by the following Formula (1):

Formula (1)

wherein $R_1$ and $R_2$ each independently represent hydrogen or an alkyl group, which is a saturated hydrocarbon, and the number of carbon atoms of the alkyl group ranges from 1 to 13, or a hydrate thereof.

2. The method for manufacturing light control particles according to claim 1, wherein the alkaline earth metal iodide (B) is calcium iodide.

3. The method for manufacturing light control particles according to claim 1, wherein the heterocyclic compound (C) is a compound represented by the following Formula (1):

Formula (1)

wherein $R_1$ and $R_2$ each independently represent hydrogen or an alkyl group, which is a saturated hydrocarbon, and the number of carbon atoms of the alkyl group ranges from 1 to 13.

4. The method for manufacturing light control particles according to claim 1, wherein in the step of granulating, cellulose nitrate is caused to coexist therewith.

5. A light control film, having a light control layer comprising a light control material comprising:
   a resin matrix made from a polymeric medium that is cured by irradiating with an energy beam; and
   a light control suspension comprising: a dispersing medium; and light control particles that are dispersed in the dispersing medium so as to be in a flowing state,
   wherein the light control particles are obtained by the method for manufacturing light control particles according to claim 1.

6. The method for manufacturing light control particles according to claim 1, wherein $R_1$ and $R_2$ are independently selected from the group consisting of methyl, ethyl, propyl, isopropyl, butyl, isobutyl and t-butyl.

7. A light control film, having a light control layer comprising a light control material comprising:
   a resin matrix made from a polymeric medium that is cured by irradiating with an energy beam; and
   a light control suspension comprising: a dispersing medium; and light control particles that are dispersed in the dispersing medium so as to be in a flowing state,
   wherein the light control particles are obtained by the method for manufacturing light control particles according to claim 6.

8. The method for manufacturing light control particles according to claim 1, wherein the heterocyclic compound (C) is pyrazine-2,5-dicarboxylic acid.

9. A light control film, having a light control layer comprising a light control material comprising:
   a resin matrix made from a polymeric medium that is cured by irradiating with an energy beam; and
   a light control suspension comprising: a dispersing medium; and light control particles that are dispersed in the dispersing medium so as to be in a flowing state,
   wherein the light control particles are obtained by the method for manufacturing light control particles according to claim 8.

10. The method for manufacturing light control particles according to claim 1, wherein included with components (A), (B) and (C), is water, included in an amount of from 7.5 to 9.6 parts by mass relative to 100 parts by mass of the whole of components (A), (B) and (C).

11. The method for manufacturing light control particles according to claim 1, wherein the amount of methanol present is 59.2 to 98.7 parts by mass relative to 100 parts by mass of the whole of components (A), (B) and (C).

* * * * *